R. R. RICHARDSON.
FRUIT BOX.
APPLICATION FILED MAY 31, 1912.
1,200,522.
Patented Oct. 10, 1916.
3 SHEETS—SHEET 1.
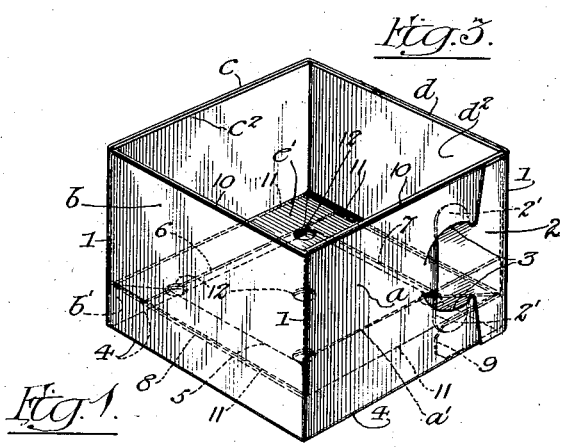
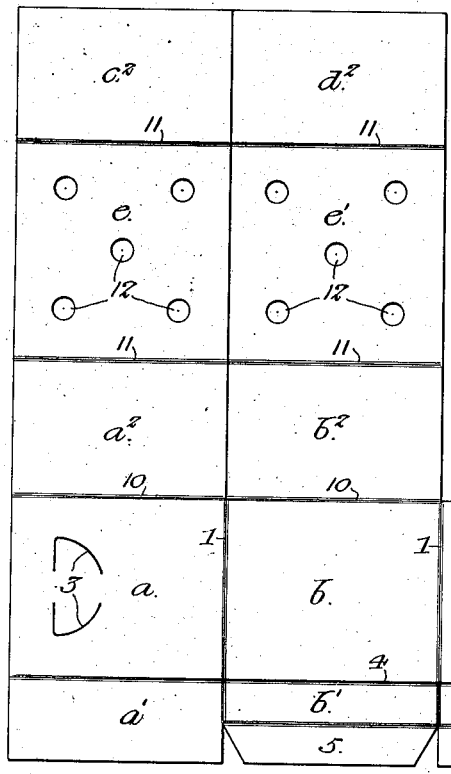
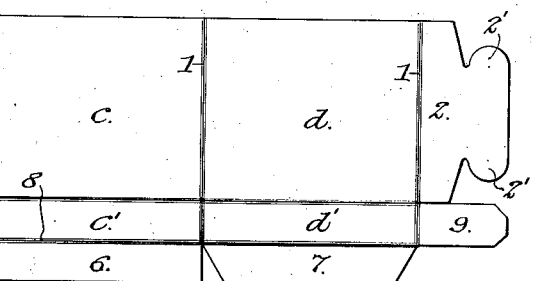
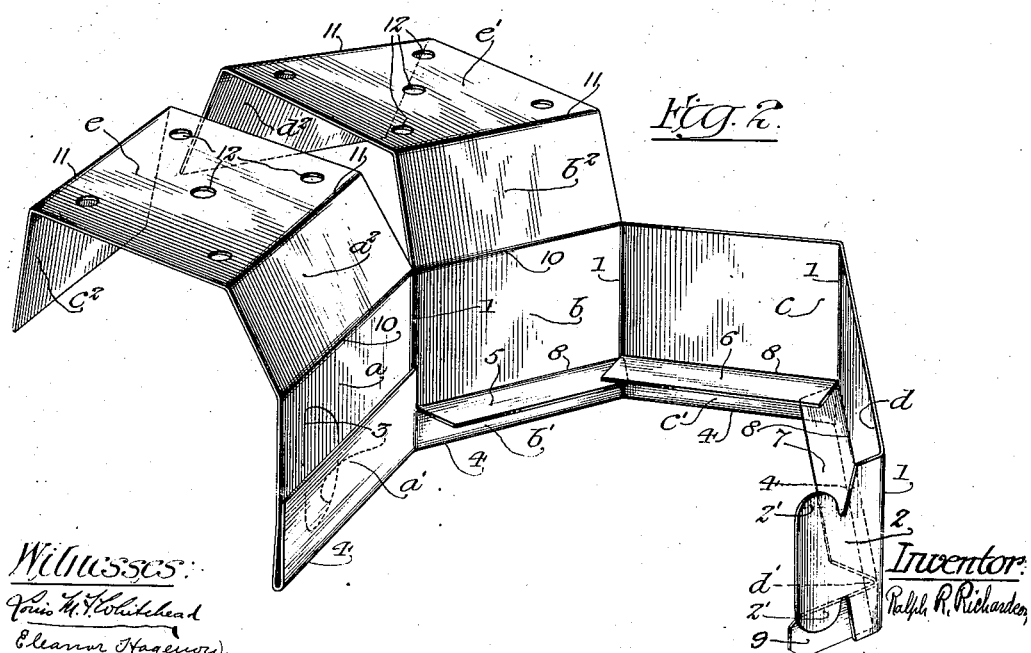

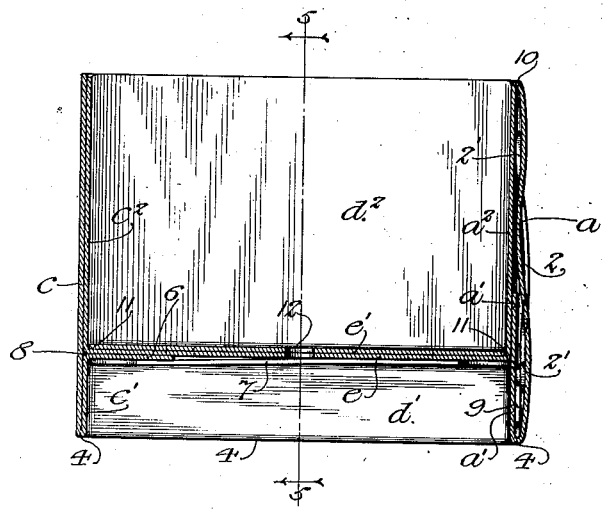
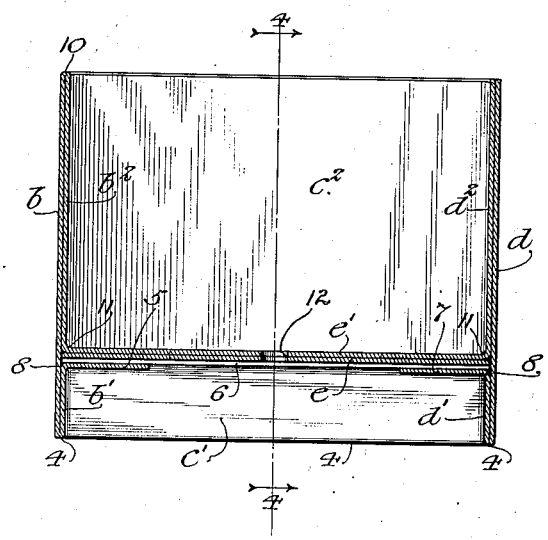

R. R. RICHARDSON.
FRUIT BOX.
APPLICATION FILED MAY 31, 1912.
1,200,522.
Patented Oct. 10, 1916.
3 SHEETS—SHEET 3.
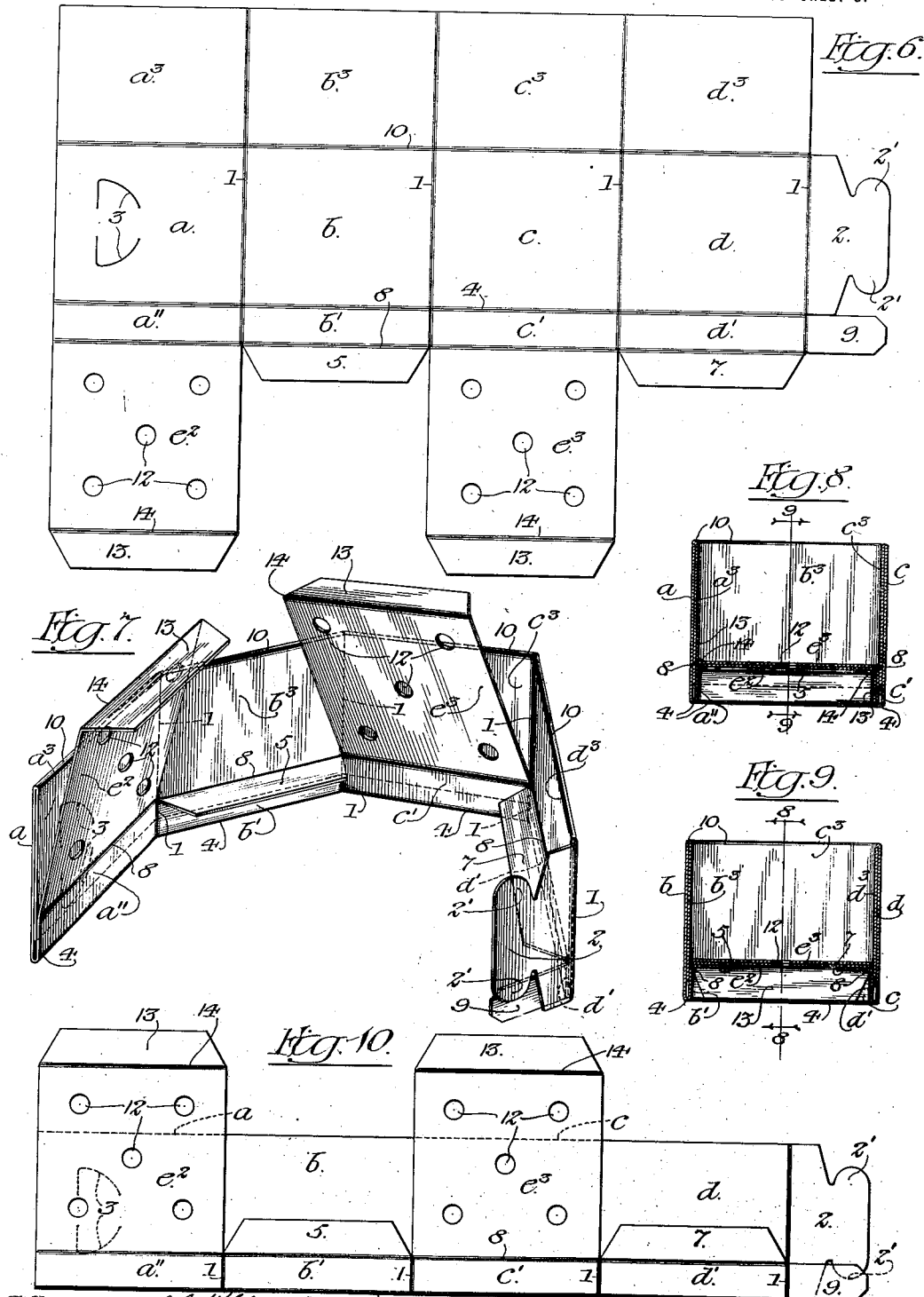

UNITED STATES PATENT OFFICE.

RALPH R. RICHARDSON, OF CHICAGO, ILLINOIS, ASSIGNOR TO CHICAGO CARTON COMPANY, OF CHICAGO, ILLINOIS, A CORPORATION.

FRUIT-BOX.

1,200,522.  Specification of Letters Patent.  Patented Oct. 10, 1916.

Application filed May 31, 1912. Serial No. 700,726.

*To all whom it may concern:*

Be it known that I, RALPH R. RICHARDSON, a citizen of the United States, and a resident of Chicago, county of Cook, and State of Illinois, have invented certain new and useful Improvements in Fruit-Boxes, of which the following is a full, clear, and exact description.

The invention relates to fruit boxes and seeks to provide a simple, strong construction which can be economically manufactured and preferably of heavy paper or pasteboard, and in which the bottom of the box is securely supported in position above the lower edge thereof.

A further object of the invention is to provide an improved fruit box in which the bottom and side walls are formed of double thicknesses, and preferably of heavy paper or pasteboard.

The invention also seeks to provide a collapsible or knock-down construction which can be economically constructed from a single blank of simple form.

The invention consists in the features of improvement hereinafter set forth, illustrated in the preferred form in the accompanying drawings and more particularly pointed out in the appended claims.

In the drawings, which illustrate the preferred construction of the improved fruit box, Figure 1 is a view of the blank from which the box is formed. Fig. 2 is a perspective view of the blank in partially folded condition. Fig. 3 is a perspective view of a completed box. Fig. 4 is a cross-section on line 4—4 of Fig. 5. Fig. 5 is a cross-section on line 5—5 of Fig. 4. Fig. 6 is a view of a modified form of the improved box. Fig. 7 is a perspective view of the same in partially folded condition. Fig. 8 is a cross-section of the completed box taken on the line 8—8 of Fig. 9. Fig. 9 is a cross-section on the line 9—9 of Fig. 8. Fig. 10, is a blank of a further modification, the blank being shown folded for shipment.

In accordance with the preferred embodiment of the invention, the improved box is formed of a single blank of heavy paper or pasteboard, and this blank is preferably of the form shown in Fig. 1. The body portion of the box comprises connected side walls $a$, $b$, $c$ and $d$, the blank being scored transversely along the lines 1, to form the vertical corner folds between the side walls. The body portion of the box is provided at one end with an integral extension or flap 2 which is adapted to be secured to the opposite end thereof to connect the side walls. In the preferred construction shown, the flap 2 is integral with the side wall $d$ and is arranged to overlap the side wall $a$. The reduced outer edge of the flap is provided with laterally projecting tongues 2' which are arranged to interlock with slits 3 in the side wall $a$ to thereby detachably connect the ends of the body portion of the box.

The box is provided with lower, inner side-sections which extend from its lower edges upwardly over the inner faces of the side walls to form a lower edge of double thickness beneath the bottom of the box which is supported above its lower edge. Preferably, also, the box is provided above its bottom with upper, inner side-sections which extend downwardly from the upper edges thereof. The lower, inner side sections $a'$, $b'$, $c'$ and $d'$ are formed integral with the corresponding side walls $a$, $b$, $c$, and $d$, the blank being scored along the lower edge of the side walls upon the line 4, so that the lower side-sections may be folded upwardly and inwardly over the inner faces of the side walls. Certain of the lower side extensions are provided with flaps which are adapted to extend inwardly therefrom and support the box bottom. For this purpose, the lower edge of the blank is cut or notched at intervals in line with the corner folds 1 of the box to form flaps 5, 6 and 7, which are integral, respectively, with the lower side extensions $b'$, $c'$ and $d'$, the blank being scored along the line 8 between these parts, so that the flaps 5, 6 and 7 can be folded or extended inwardly from the side walls of the box, to thereby sustain the box bottom. While the inwardly extending flaps 5, 6 and 7 are separated from one another, the lower side sections $a'$, $b'$, $c'$ and $d'$ are integral with one another and are connected at their ends along the scored lines 1. Preferably, as shown, the section $a'$ is not scored and is not provided with an inwardly extending flap.

Before the ends of the body portion are connected, the lower side extensions are folded upwardly about the line 4 and against the inner faces of the side walls. The flaps 5, 6 and 7 are then folded upon the line 8 and project inwardly at right angles to the side walls to support the box bottom. The lower, inner side-sections $a'$, at one end of the box, as stated, is preferably not scored and is not provided with an inwardly extending flap. Its width, however, is preferably greater than that of the other side extensions and, in the form shown, is equal to the combined width of one of the other extensions and the flap thereon. The inner, side extension $d'$ at the opposite end of the body portion is provided with an integral, laterally projecting tongue 9 which, when the box is assembled, is adapted to be inserted between the side walls $a$ and the lower, inner side-section $a'$. By forming the foldable, lower, inner side-sections $a'$, $b'$, $c'$ and $d'$ integral with one another and connecting the ends thereof by the tongue 9, as in the preferred construction shown, the sections securely uphold the bottom supporting flaps 5, 6 and 7, so that the latter will properly uphold the box bottom. This arrangement too obviates the need of pasting, stapling or otherwise securing the lower, inner side sections $a'$, $b'$, $c'$ and $d'$ to the inner faces of the side walls of the box.

The box bottom comprises two overlapping sections $e$ and $e'$ which are supported one above the other upon the inwardly projecting flaps 5, 6 and 7. Each of the bottom sections is preferably of sufficient size to fill the space within the box and engage the side walls thereof to hold the same extended. The bottom sections are preferably formed integral with upper, inner side sections $a^2$, $b^2$, $c^2$ and $d^2$ which extend from the upper edge of the box downwardly over the inner faces of the side walls to the box bottom. These inner side-sections are formed integral with the body of the box and are connected thereto at its upper edge along a score 10.

The inner side sections $a^2$, $b^2$, $c^2$ and $d^2$ and the overlapping bottom sections $e$ and $e'$ are preferably formed of two extensions integral, respectively, with two adjacent side walls $a$ and $b$, each of these extensions being scored along the lines 11 to form folds between the bottom sections $e$ and $e'$ and the side-sections $a^2$, $b^2$, $c^2$ and $d^2$.

In setting up the box, as stated, the lower, inner side-sections are first folded about the line 4 to engage the inner faces of the side walls $a$, $b$, $c$ and $d$, and the flaps are turned away from the side walls about the line 8. The side walls are then folded upon the corner scores 1, as indicated in Fig. 2. Preferably, when the box is so folded, the bottom supporting flap 6, opposite the lower side-section $a'$ is arranged above and rests upon the adjacent ends of the other bottom supporting flaps 5 and 7, as shown. As the ends of the body portion are brought together, the tongue 9 is inserted in place between the side wall $a$ and the lower, inner side-section $a'$. The flap 2 is lapped over the outer face of the side wall $a$ and the tongues $2'$ thereof are inserted in the cuts or slits 3 to securely connect the ends of the body portion. The extensions which form the upper, inner side-sections and the bottom sections are folded, as indicated in Fig. 2, upon the scored lines 11 and are then folded one at a time upon the scores or hinge connections 10 and inserted into the box. The extension comprising the parts $a^2$, $c^2$ and $e$ and which is in line with the lower side-section $a'$, is preferably first folded into the box, the parts or sections $a^2$ and $c^2$ extending over the inner faces of the side walls $a$ and $c$ and the bottom section $e$ resting upon the supporting flaps 5, 6 and 7. In this position, the inner side-section $a^2$ overlaps the upper edge of the lower side-section $a'$, as shown in Fig. 4, to thereby securely hold the latter and the tongue 9 interlocked therewith, against displacement. The extensions comprising the parts $b^2$, $d^2$ and $e'$ are then folded within the box, the upper side sections $b^2$ and $d^2$ engaging the inner faces of the side walls $b$ and $d$ and the bottom section $e'$ overlying the lower bottom section $e$.

The foldable parts which extend from the upper edges of the two adjacent side walls $a$ and $b$ snugly fit within the box and strengthen and support the side walls thereof and securely hold them in extended position. By withdrawing these parts from the box, and folding the flaps 5, 6 and 7 upwardly against the inner faces of the side walls, the box can be collapsed without disconnecting the ends of the body portion and shipped in this collapsed or knock-down form, so that, if desired, the ends of the body portion can be permanently connected without destroying the collapsible or knockdown feature of the box. Preferably, however, the ends of the box body are provided with the detachable interlocking means shown and the box can then be shipped, if desired, completely knocked down.

In the form shown in Figs. 6 to 9, inclusive, the lower, inner side-sections $a''$ is of the same width as the other lower side sections $b'$, $c'$ and $d'$ and one of the bottom sections $e^2$ integral therewith being connected thereto along a continuation of the score 8. The lower side-sections $b'$ and $d'$, as in the form previously described, are provided with narrow bottom supporting flaps 5 and 7. The sections $c'$, intermediate the sections $b'$ and $d'$ instead of being provided with a flap, has an extension forming the other bottom-section $e^3$. The bottom sections are provided at their ends with flaps 13 connected thereto along the scored lines 14. The end edges of the flaps 13 are preferably cut away or beveled, as shown. The end edges of the flaps 5 and 7 are also preferably cut away or beveled in both forms.

The box body, in the forms shown in Figs.

6 to 9, inclusive, is provided, if double side walls above the bottom are desired, with upper, inner side-sections $a^3$, $b^3$, $c^3$ and $d^3$, these sections being connected to the side walls $a$, $b$, $c$ and $d$ at their upper edges along the scored line 10. These sections may, if desired, be separated from one another, but are preferably integrally connected at their adjacent edges along extensions of the scored lines 1.

In forming the completed box, the upper, side-sections are thus folded upon the scored line 10 onto the inner faces of the side walls $a$, $b$, $c$ and $d$. The lower, side-sections $a''$, $b'$, $c'$ and $d'$ are then folded upwardly about the scored line 4 onto the inner face of the side walls and over the lower edges of the upper, inner side-sections, the latter being of sufficient length to extend downwardly inside of the lower, side-sections, as clearly indicated in Figs. 8 and 9. The boxes are preferably shipped to the user in this condition.

The user, to set up the box, turns the flaps 5 and 7 outwardly and folds the body of the box about the corner scores 1, as indicated in Fig. 7. Then, to connect the end portions of the body of the box and the end, lower, side-sections $a''$ and $d'$, the tongue 9 is inserted between the side wall $a$ and the lower, side-section $a''$ thereon, the flap 2 is extended over the outer face of the side wall $a$ and the tongues 2' thereof inserted in the slots 3, as in the constructions shown in Figs. 1 to 5, inclusive. The oppositely arranged, bottom-sections $e^2$ and $e^3$ are then turned down into the box and onto the oppositely arranged, bottom-supporting flaps 5 and 7. The bottom section which is first folded into the box, for example, the bottom section $e^2$, has its flap 13 turned down and inserted between the ends of the flaps 5 and 7 and the inner face of the section $c'$. As shown in Fig. 8, the flap on the upper, bottom-section $e^3$ is turned upwardly and abuts snugly against the side wall $c$—$c^3$ to hold the upper bottom section in place. It is obvious that in this form and as illustrated in Fig. 9, the upper, inner side-sections may be omitted. In this figure, the lower, inner side-sections and the bottom sections are shown folded onto the inner faces of the side walls of the box, the latter being preferably shipped in this initially folded condition.

The improved construction can be conveniently knocked down and set up and is extremely strong and rigid. The lower supporting edge of the box is of double thickness and, in the preferred construction, the bottom and side walls are also of double thickness. The lower portions of the side walls are constructed to securely uphold the box bottom. The latter is supported at its edges by the lower, inner side-sections $a'$ or $a''$, $b'$, $c'$ and $d'$ and these lower side-sections are upheld and prevented from collapsing because their adjacent ends are connected by forming the sections integrally with one another and by connecting the section $d'$ at one end of the box body to the section $a'$ or $a''$ at the opposite end by means of the tongue 9. This cheapens the cost of the box, since it is then unnecessary to secure the lower, inner side-sections in place by paste, staples or the like. In all of the forms shown, the foldable bottom sections fit snugly within the box and are provided with flaps or sections at their free edges bearing against the wall opposite to which they are connected, so that the bottom sections are securely held in position.

A further advantage of the improved construction shown is that in each form the blank is of simple outline and such that it can be economically cut from the paper or pasteboard stock. The blank shown in Fig. 1 is L-shaped and the portion of the paper or pasteboard stock lying in the angle between the parts thereof can form the extensions on the body portion of the next adjacent blank. In the form shown in Fig. 6, the parts cut out between the bottom-sections $e^2$ and $e^3$ and the right-hand side of the section $e^3$ can form the corresponding sections of the next adjacent blank. For purposes of ventilation, the bottom-sections $e$ and $e'$ of the form shown in Figs. 1 to 5, and the bottom sections $e^2$ and $e^3$ of the form shown in Figs. 6 to 10, inclusive, are preferably provided with a series of holes 12, which register when these sections are overlapped. If desired, the side walls may also be provided with such openings.

In the form of the invention illustrated in Fig. 10, the construction of the box is the same as that illustrated in Fig. 6 of the drawings, except that the upper, inner side sections $a^3$, $b^3$, $c^3$ and $d^3$ of Fig. 6 are omitted. In Fig. 10, the lower inner side sections are formed integral with the side walls of the box, two of the lower side sections having formed integral therewith the bottom sections, while the remaining two of the side sections have integral therewith the flaps that will extend beneath the side sections. In this form of the invention, the bottom sections are provided at their free ends with flaps 13 connected thereto along the scored lines 14.

It is obvious that numerous changes may be made in the details set forth without departure from the essentials of the invention as defined in the claims.

I claim as my invention:—

1. A fruit box comprising connected side walls, upper and lower, inner side-sections extending from the upper and lower edges of said side walls, overlapping bottom-sections above the lower edge of the box and supporting flaps beneath and parallel to said bottom-sections, said bottom-sections and said supporting flaps extending inwardly from said inner side-sections and said supporting flaps being connected to said lower side sections, substantially as described.

2. A fruit box comprising connected side walls, upper and lower inner side-sections connected to said side walls and extending from the upper and lower edges thereof, overlapping bottom-sections integral with said inner side-sections and extending inwardly therefrom above the lower edge of the box, and supporting flaps integral with said lower side-sections and extending inwardly therefrom beneath and parallel to said bottom-sections, substantially as described.

3. A collapsible fruit box comprising connected side walls, upper and lower, inner side-sections connected to said side walls and extending from their upper and lower edges over the inner faces thereof, a double bottom comprising overlapping sections integral with said inner side-sections, and extending inwardly therefrom above the lower edge of the box, and flaps integral with said lower side-sections and extending inwardly therefrom beneath and parallel to said bottom sections to support the latter, each of said bottom-sections being arranged to engage said side walls to hold the same extended, substantially as described.

4. A fruit box formed of a single blank and comprising a body portion connected at its ends and scored transversely to form side walls, said body portion having integral upper and lower, inner side-sections extending from its edges and engaging the inner faces of said side walls and overlapping bottom-sections integral with said inner side-sections and extending inwardly therefrom above the lower edge of the box, said lower side-sections having integral flaps extending inwardly therefrom beneath and parallel to said bottom-sections to support the latter, substantially as described.

5. A collapsible fruit box formed of a single blank and comprising a body portion having detachable interlocking means at its ends and scored transversely to form connected side walls, integral upper and lower, inner side-sections extending from the upper and lower edges of said side walls over their inner faces, a double bottom formed of overlapping sections integral with said inner side-sections and extending inwardly therefrom above the lower edge of the box, and inwardly extending flaps integral with said lower side-sections and arranged beneath said bottom-sections to support the same, each of said bottom-sections being of sufficient size to fill the space within said box and hold said side walls extended, substantially as described.

6. A collapsible fruit box formed of a single blank and comprising a body portion connected at its ends and scored transversely to form side walls, integral, upper and lower, inner sections extending over the inner faces of said side walls from the upper and lower edges thereof, a double bottom comprising overlapping sections integral with said upper side-sections, and flaps integral with and extending inwardly from the upper edges of said lower side-sections and arranged beneath and parallel to said bottom sections to uphold the same above the lower edge of the box, substantially as described.

7. A collapsible fruit box comprising connected side walls, a double bottom formed of overlapping sections, inner side-sections connected to the opposite side edges of each of said bottom sections and extending upwardly therefrom over the inner faces of said side walls to the upper edge of the box, two of said side sections being permanently connected to two adjacent side walls, and lower, inner side sections connected to said side walls and extending upwardly from the lower edges thereof and having inwardly extending flaps arranged beneath and parallel to said bottom-sections and supporting the same above the lower edge of the box, substantially as described.

8. A collapsible fruit box formed of a single blank and comprising a body portion connected at its ends and scored transversely to form side walls, a double bottom formed of overlapping sections each having integral inner side-sections extending upwardly from opposite edges thereof to the upper edge of the box, two of said side-sections being integrally connected to two adjacent side walls, lower, inner side-sections integral with and extending upwardly from the lower edges of said side walls, and flaps integral with said lower side-sections and extending inwardly beneath and parallel to said bottom-sections to support the latter above the lower edge of the box, substantially as described.

9. A fruit box comprising a blank foldable to form side walls and connected at its ends, foldable inner side-sections integral with and extending upwardly from the lower edges of said side walls to form a base portion of double thickness, said side-sections being integrally connected at their adjacent ends and some of said sections having integral, inwardly extending flaps, means connecting the inner side-sections at the ends of the blank, and a folding bottom connected to said side walls and supported on said flaps above the lower edge of the box, substantially as described.

10. A folding fruit box comprising a body portion having interlocking means at its ends and scored to form side walls *a*, *b*, *c*, and *d*, said side walls having inner side sections $a'$, $b'$, $c'$ and $d'$ integral therewith and extending upwardly from their lower edges, said inner side sections being integrally connected at their adjacent ends, the inner side section $a'$ at one end of the body portion being wider than the other of said inner side sections and the latter having inwardly extending flaps 5, 6 and 7, the inner side section $d'$ at the opposite end of the body portion having a tongue inserted between said inner side section $a'$ and the adjacent side wall $a$, and a folding bottom connected to the latter side wall $a$ and supported on said flaps, substantially as described.

11. A folding fruit box comprising a body portion having connecting means at its ends and scored to form side walls $a$, $b$, $c$ and $d$, said side walls having side sections $a'$, $b'$, $c'$ and $d'$ integral therewith and extending upwardly from their lower edges, said inner side sections being integrally connected at their adjacent ends, the inner side section $a'$ at one end of the body portion being wider than the other of said inner side sections and the latter having inwardly extending flaps 5, 6 and 7, the inner side sections $d'$ at the opposite end of the body portion having a tongue inserted between the inner side section $a'$ and the adjacent side wall $a$, and a double bottom comprising a bottom section $e$ having opposite integral, upper side sections $a^2$ and $c^2$ and a second bottom section $e'$ having opposite, integral, upper side sections $b^2$ and $d^2$, two of said upper side sections $a^2$ and $b^2$, one on each of said bottom sections, being integrally connected to the upper edges of two adjacent side walls $a$ and $b$, substantially as described.

12. A collapsible fruit box comprising a blank foldable to form side walls and connected at its ends, lower, inner side-sections connected to and extending upwardly from the lower edges of said side walls to form a lower edge of double thickness, some of said inner side-sections having integral, inwardly extending flaps, and a folding bottom section parallel to and supported on said flaps, said bottom section being connected to one of said side walls and having an upturned side-section engaging the opposite side wall, said bottom section being arranged to hold said side walls extended, substantially as described.

13. A collapsible fruit box comprising a blank foldable to form side walls and connected at its ends, lower, inner side-sections connected to and extending upwardly from the lower edges of said side walls to form a lower edge of double thickness, some of said inner side-sections having integral, inwardly extending flaps, and a double bottom parallel to and supported on said flaps, said bottom comprising two sections supported on said flaps, connected to two adjacent side walls and arranged to engage the other side walls to hold the same extended, substantially as described.

14. A fruit box comprising a blank foldable to form side walls and connected at its ends, foldable inner side-sections integral with and extending upwardly from the lower edges of said side walls to form a supporting base portion of double thickness, said side-sections being integrally connected at their adjacent ends and some of said sections having integral, inwardly extending flaps, means connecting the inner side-sections at the ends of the blank and a double bottom comprising two, foldable overlapping sections each having integral, side sections extending upwardly from opposite edges thereof, two of the latter side sections being connected to two adjacent side walls, substantially as described.

15. A box comprising a body portion connected at its ends and scored transversely to form side walls, lower, inner side-sections extending upwardly from the lower edges of said side walls to form a supporting base portion of double thickness, two of said sections at opposite sides of the box having inwardly extending flaps above and parallel to the lower edge of the box, and a folding bottom connected to one of said side walls and having an extension at its free end arranged at right angles thereto and abutting against the opposite side wall, the other opposite edges of said bottom being supported on said flaps and arranged adjacent the other side walls of the box, substantially as described.

16. A box comprising a body portion connected at its ends and scored transversely to form side walls, foldable inner side-sections integral with and extending upwardly from the lower edges of said side walls to form a supporting base portion of double thickness, said inner side sections being integrally connected at their adjacent ends and two of said sections, at opposite sides of the box, having integral, inwardly extending flaps at their upper edges, means connecting the inner side sections at the ends of said body portion, and a folding bottom comprising overlapping sections supported on said flaps, each of said bottom-sections being connected to one of said side walls and having an extension at its free end folded at right angles thereto and engaging the side wall opposite that to which it is connected, substantially as described.

RALPH R. RICHARDSON.

Witnesses:
ELEANOR HAGENOW,
KATHARINE GERLACH.